3,312,669
POLYTHIOPOLYMERCAPTAN BASED SEALANT
COMPOSITION AND BONDING PROCESS
Joseph J. Giordano, Trenton, N.J., assignor to Thiokol Chemical Corporation, Bristol, Pa., a corporation of Delaware
No Drawing. Filed Sept. 26, 1963, Ser. No. 311,661
18 Claims. (Cl. 260—79.1)

The present invention relates to a novel liquid polysulfide polymer based sealant composition and to processes for bonding liquid polysulfide polymer based sealant compositions to structural element substrates.

Curable, liquid polysulfide polymer based sealant and caulking compositions have long been known in the art. They are based on curable, liquid, mercaptan terminated polysulfide polymers. The structure and preparation of these polythiopolymercaptan polymers are disclosed in U.S. 2,466,963. These compositions are used in sealing and/or caulking operations to bond together, and/or fill seams between, various types of structural elements in various industries. The adhesive qualities of polysulfide polymers are such, however, as to usually require the use of an adhesive additive in the polysulfide polymer bases sealant composition in order to insure a good bonding of the cured sealant to the substrate. The adhesive additives which have been available for this purpose to date, however, such as those of a phenolic nature, usually only provide for a polar, rather than a chemical, type bonding of the cured sealant to the substrate. This polar type of bonding is susceptible to attack by polar solvents such as water whereupon the bond tends to lose its strength and thus impair the utility of the sealant under conditions where it is subject to such attacks. Those in the art have not been able, prior to the advent of the present invention, to provide an adhesive additive and/or process whereby polysulfide polymer based sealant compositions can be strongly and chemically bonded to the substrate(s) being treated therewith where the coated substrate(s) are to be in prolonged contact with polar solvents.

An object of the present invention, therefore, is to provide a novel liquid polysulfide polymer based caulking or sealant composition which will allow for the attainment of a strong and lasting bonding of the sealant to the substrate(s) to be treated therewith, particularly for those applications where the sealant is to be used in the presence of polar solvents.

Another object of the present invention is to provide one or more processes by means of which liquid polysulfide polymer based sealant and caulking compositions may be used so as to attain a strong and lasting bonding of the cured composition to the substrate(s) being treated therewith, particularly where the sealant is to be used in the presence of polar solvents.

It has now been unexpectedly found according to the present invention that a strong and lasting bonding of cured, liquid polysulfide polymer based sealant and caulking compositions to the substrate(s) being treated therewith can be attained, particularly in the presence of polar solvents, if the sealant composition is used in conjunction with one or more adhesive additive compounds having the structure HS—R—Si—(OR')$_3$ in which R and R' may be the same or different lower alkyl radicals such as methyl, ethyl, propyl, isopropyl, butyl, etc. In a given case, the three R' groups present in the compound(s) being used may be the same or different lower alkyl group(s).

The adhesive additive compound may be used according to the present invention in the form of a prime coat wherewith the substrate to be treated is first primed and the liquid polysulfide polymer based sealant compositions is then added to, and cured on, the thus treated substrate. The silicon containing adhesive additive may also be used, according to the present invention, by being admixed into the curable, liquid polysufide polymer based sealant or caulking composition and then applying, and curing thereon, the curable composition to the substrate(s) being treated. Whether used as a priming agent and/or admixed in the sealant composition, the silane containing adhesive additive should be used in such a quantity as to provide about 1 to 3.5 parts by weight of the additive per 100 parts by weight of the curable, liquid polymer being used.

The adhesive additive of the present invention, as noted above, may be termed a mercapto alkyl polyalkoxy silane. Examples of such compounds are mercapto propyl trimethoxysilane and mercapto propyl triethoxysilane.

The polysulfide polymers upon which the sealant or caulking compositions of the present invention are based are those liquid polythiopolymercaptan polymers as are disclosed and claimed, as noted above, in U.S. Patent 2,466,963. The most preferred of such polymers, according to the present invention, are those having a molecular weight of about 500 to 4000. Polymers having such molecular weights are preferred in that they allow for the most efficient cure times.

The liquid polysulfide polymer curing agents which may be used in the sealant compositions of the present invention include all those materials known to the art as liquid polysulfide polymer curing agents such as polyepoxy resins, lead peroxide, calcium peroxide, barium peroxide, tellurium dioxide and the various chromate salts such as are disclosed in U.S. 2,964,503. About 2.5 to 10 parts by weight of one or more of such curing agents should be used according to the present invention, per 100 parts by weight of liquid polysulfide polymer being used.

With the novel sealant compositions and processes of the present invention, a strong bonding of the cured sealant composition to the substrate can be obtained in about 2 to 24 hours at room temperature (about 25° C.).

It is to be understood, according to the present invention, that the concept of "treating" one or more substrates by means of the novel processes and/or compositions disclosed herein includes providing such substrates with protective coatings of the cured compositions of the present invention and/or filling voids between and/or bonding together two or more substrates which substrates may or may not be composed of the same material. The substrates to be thus treated, according to the present invention, include those of a wood nature, those of a silicaceous nature such as glass and those of a metallic nature such as aluminum, iron and steel as well as zinc and/or chrome coated iron or steel.

The curable compositions of the present invention may also contain various types of inert materials commonly employed in liquid polysulfide polymer based sealant and caulking compositions such as fillers, plasticizers, pigments, ultraviolet light stabilizers, cure accelerators, and the like.

Where the silane adhesive additive compounds of the present invention are to be used as priming agents they may be applied to the surface of the substrate(s) being treated in the form of a solution so as to provide thereon at least a monomolecular layer of the silane material. The solvent medium employed in such a case should be a fairly volatile material such as ethyl alcohol, toluene, Cellosolve, methanol, n-butanol, isobutanol, chloroform, ethyl acetate, acetone and benzene.

The curable compositions of the present time have a pot life (working life) of about 0.5 to 24 hours and the pot life of these compositions must be taken into consideration when admixing and/or bringing the curing agent in contact with the adhesive additive and/or liquid polysulfide polymer.

The following example is merely illustrative of the present invention and is not intended as a limitation upon the scope thereof.

Example

In this experiment adhesive additives of the present invention were used to prime the surface of various substrates before an attempt was thereafter made to adhesively apply thereto various polysulfide polymer based sealant compositions. The additive was applied to the surface of the substrates being treated in the form of an ethyl alcohol solution by lightly wiping the surface once with a cotton swab saturated with the solution. The additive was evaluated at various levels of concentration in these solutions. The sealant formulations used were either a black or a white filled formulation having the following composition, expressed in parts by weight:

SEALANT FORMULATIONS

|  | White | Black |
|---|---|---|
| LP-32 polysulfide polymer | 100 | |
| LP-2 polysulfide polymer | | 100 |
| Witcarb RC (calcium carbonate) | 30 | |
| Titanox RA 50 (titanium dioxide) | 10 | |
| SRF #3 (carbon black) | | 30 |
| Calcium stearate (thixotropic agent) | 1 | |
| Stearic acid (retarder) | 1 | 0.25 |
| Aroclor 1254 (chlorinated hydrocarbon plasticizer containing 54% Cl) | 5 | 5 |
| HiSil 233 (hydrated silica) | 3 | 2 |
| Sulfur | 0.1 | |

The priming solutions used in this example had the following composition, expressed in parts by weight:

PRIMARY SOLUTION

|  | 1 | 2 | 3 | 4 |
|---|---|---|---|---|
| Mercapto propyl trimethoxy silane | 5 | 10 | 15 | |
| Mercapto propyl triethoxy silane | | | | 10 |
| Ethyl alcohol | 95 | 90 | 85 | 90 |

After the priming solution was applied to the substate, it was allowed to stand overnight at room temperature during which time the solvent evaporated.

After being applied to the primed surfaces, the sealant compositions were then allowed to cure for about a week at room temperature before the adhesion of the cured sealant to the substrate was tested. The tests were planned in such a way that two sets of identically coated substrates were provided so that the adhesion properties of the sealant to these substrates could be tested under two sets of conditions where the sealant was placed (1) at room temperature under tap water and (2) at room temperature while exposed to the atmosphere. The adhesion test consisted in attempting to peel a cured bead of the sealant composition from the substrate. If the bead peeled off the substrate easily without causing a rupture in the structure of the bead, this fact was noted as an adhesive failure. If the bead could not be readily removed from the substrate without tearing the bead apart, this fact was noted as cohesive failure. In the borderline instances, this fact was noted as a slight cohesive failure. The results obtained in these tests are shown in the following table:

| Primer Used | Adhesion results on aluminum substrate | | | | Test Conditions After Cure |
|---|---|---|---|---|---|
|  | 1 | 2 | 3 | 4 | |
| Sealant: | | | | | |
| White | Cohesive | Cohesive | Cohesive | Cohesive | One week at room temperature in atmosphere. |
| Black | do | do | do | do | |
| White | do | do | do | Slightly cohesive | One week at room temperature under tap water. |
| Black | Adhesive | Adhesive | do | Slightly cohesive | |

| | Adhesion results on stainless steel substrate | | | | |
|---|---|---|---|---|---|
| White | Cohesive | Cohesive | Cohesive | Cohesive | One week at room temperature in atmosphere. |
| Black | do | do | do | do | |
| White | do | do | do | do | One week at room temperature under tap water. |
| Black | Adhesive | Slightly cohesive | do | Slightly cohesive | |

| | Adhesion results on glass substrate | | | | |
|---|---|---|---|---|---|
| White | Cohesive | Cohesive | Cohesive | Cohesive | One week at room temperature in atmosphere. |
| Black | Slightly cohesive | do | do | do | |
| White | Cohesive | do | do | do | One week at room temperature under tap water. |
| Black | Adhesive | Adhesive | do | Adhesive | |

LP-32 polysulfide polymer has essentially the structure $$HS(C_2H_4-O-CH_2-O-C_2H_4-S-S-)_{23}$$
$$-C_2H_4-O-CH_2-O-C_2H_4-SH$$

with about 0.5% crosslinking or branching. LP-2 polysulfide polymer has essentially the same structure as LP-32 polysulfide polymer with about 2% crosslinking or branching.

Prior to their application to the primed substrate the sealant formulation was mixed with a lead peroxide and Aroclor 1254 curing paste admixture containing about 50% $PbO_2$.

These results of the test show that the use of the silane additives or primers according to the present invention allows both white and black filled polysulfide polymer based sealant compositions to be adhesively bonded to various substrates, even when the sealant compositions are subjected to prolonged contact to a polar solvent such as water. In the above tests, no adhesion was effected when the silane additive was deleted from the sealant compositions and/or the surface of the substrate.

I claim:
1. A curable liquid polythiopolymercaptan polymer based sealant composition comprising as an adhesive ad- ditive, about 1 to 3.5 parts by weight of at least one mercaptoalkyl polyalkoxy silane per 100 parts by weight of said polythiopolymercaptan polymer.

2. A curable sealant composition comprising, in weight ratio,
   (a) 100 parts by weight of liquid polythiopolymercaptan polymer,
   (b) about 2.5 to 10 parts by weight of liquid polythiopolymercaptan polymer curing agent and
   (c) about 1 to 3.5 parts by weight of at least one compound having the structure HS—R—Si(—OR')$_3$ in which R is an alkylene group and R' is a lower alkyl group.

3. A composition as in claim 2 in which R is propyl.
4. A composition as in claim 2 in which R' is methyl.
5. A composition as in claim 2 in which R' is ethyl.
6. A composition as in claim 2 in which said curing agent is lead dioxide.
7. A process for bonding a curable, liquid polythiopolymercaptan polymer based sealant composition in cured form, to a substrate which comprises treating said substrate, prior to the application of said composition thereto, with a primer which is essentially a compound having the structure HS—R—Si(—OR')$_3$ in which R is an alkylene group and R' is a lower alkyl group, applying said composition containing curing agent in adhesive relationship to the primed substrate and curing said composition on said substrate.
8. A process as in claim 7 in which said substrate is glass.
9. A process as in claim 7 in which said substrate is steel.
10. A process as in claim 7 in which said substrate is aluminum.
11. A process as in claim 7 in which said compound is mercapto propyl trimethoxysilane.
12. A process as in claim 7 in which said compound is mercapto propyl triethoxysilane.
13. A process as in claim 7 in which said curable composition comprises 100 parts by weight of liquid polythiopolymercaptan polymer and about 2.5 to 10 parts by weight of liquid polythiopolymercaptan polymer curing agent.
14. A process as in claim 13 in which said curing agent is lead dioxide.
15. An article which is a substrate having on at least one surface thereof a layer of mercapto alkyl polyalkoxy silane molecules, said layer being at least monomolecular in depth, and bonded thereto, a cured polythiopolymercaptan polymer based sealant composition.
16. An article as in claim 15 in which said substrate is glass.
17. An article as in claim 15 in which said substrate is steel.
18. An article as in claim 15 in which said substrate is aluminum.

References Cited by the Examiner

UNITED STATES PATENTS 2,719,165  9/1955  Cooper _____ 260—46.5
3,170,940  2/1965  Johnston _____ 260—46.5

OTHER REFERENCES

Gaylord: Polyethers, "Polyalkylene Sulfide and Other Polythioethers," Interscience Publishers (John Wiley and Sons), New York, vol. XIII, 1962, pages 131 and 165.

LEON J. BERCOVITZ, *Primary Examiner.*

M. I. MARQUIS, *Assistant Examiner.*